United States Patent
Doman et al.

(10) Patent No.: US 11,909,831 B2
(45) Date of Patent: *Feb. 20, 2024

(54) MULTI-SESSION COOKIE SWAP

(71) Applicant: State Farm Mutual Automobile Insurance Company, Bloomington, IL (US)

(72) Inventors: Adam Doman, Gibson City, IL (US); Jeff Himmell, Downs, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/195,817

(22) Filed: May 10, 2023

(65) Prior Publication Data

US 2023/0283677 A1  Sep. 7, 2023

Related U.S. Application Data

(63) Continuation of application No. 17/318,867, filed on May 12, 2021, now Pat. No. 11,689,627.

(Continued)

(51) Int. Cl.
*H04L 67/146* (2022.01)
*H04L 67/143* (2022.01)
(Continued)

(52) U.S. Cl.
CPC ............ *H04L 67/146* (2013.01); *H04L 67/02* (2013.01); *H04L 67/143* (2013.01); *H04L 67/60* (2022.05); *H04L 67/535* (2022.05)

(58) Field of Classification Search
None
See application file for complete search history.

(56) References Cited

U.S. PATENT DOCUMENTS

| | | |
|---|---|---|
| 7,720,977 B1 | 5/2010 | Li |
| 7,805,495 B2 | 9/2010 | Marmaros |

(Continued)

OTHER PUBLICATIONS

Huang, et al., "Parallel Browsing Behavior on the Web", In Proceedings of the 21st ACM conference on Hypertext and Hypermedia, 2010, pp. 13-18.

(Continued)

*Primary Examiner* — Mohamed Ibrahim
(74) *Attorney, Agent, or Firm* — Lee & Hayes, P.C.

(57) ABSTRACT

A web browser can manage different session cookies associated with a website by storing the session cookies in distinct tab storage locations associated with different tabs of the web browser, instead of in a global storage location accessible by any tab of the web browser. When the web browser prepares to send a request associated with an active tab to a server associated with the website, the web browser can temporarily copy a corresponding session cookie into the global storage location from the tab storage location associated with the active tab. Accordingly, even if the website does not natively support multiple concurrent user sessions with the web browser, the web browser can send different session cookies to the website based on which tab of the web browser is active, and thereby allow users to engage in different user sessions with the website in different tabs.

20 Claims, 4 Drawing Sheets

Related U.S. Application Data

(60) Provisional application No. 63/034,875, filed on Jun. 4, 2020.

(51) Int. Cl.
  *H04L 67/02* (2022.01)
  *H04L 67/60* (2022.01)
  *H04L 67/50* (2022.01)

(56) References Cited

U.S. PATENT DOCUMENTS

| | | |
|---|---|---|
| 7,991,830 B2 | 8/2011 | Li |
| 8,392,837 B2 | 3/2013 | Li |
| 8,782,799 B2 | 7/2014 | Phillips et al. |
| 9,137,319 B2 | 9/2015 | Xu et al. |
| 9,218,428 B2 | 12/2015 | Reddy et al. |
| 9,360,987 B2 | 6/2016 | Li |
| 9,479,613 B2 | 10/2016 | Harvey et al. |
| 9,485,240 B2 | 11/2016 | Tian et al. |
| 10,156,967 B2 | 12/2018 | Karunamuni et al. |
| 10,447,729 B2 | 10/2019 | O'Connor |
| 10,645,173 B2 | 5/2020 | Luczynski et al. |
| 10,938,755 B1 | 3/2021 | MacMillin et al. |
| 10,938,915 B1 | 3/2021 | Schwesinger et al. |
| 11,256,772 B2 | 2/2022 | Shah et al. |
| 2007/0157304 A1 | 7/2007 | Logan et al. |
| 2008/0209050 A1 | 8/2008 | Li |
| 2012/0303656 A1 | 11/2012 | Iida et al. |
| 2014/0280699 A1 | 9/2014 | Mohapatra et al. |
| 2015/0347616 A1* | 12/2015 | Levi .................. G06F 16/9535 715/234 |
| 2016/0173615 A1 | 6/2016 | Pattan |
| 2019/0132397 A1* | 5/2019 | Luczynski ............ H04L 67/141 |
| 2019/0394232 A1 | 12/2019 | O'Connor |

OTHER PUBLICATIONS

Office Action for U.S. Appl. No. 17/318,867, dated May 10, 2022, Doman, "Multi-Session Cookie Swap", 23 pages.

* cited by examiner

MULTI-SESSION COOKIE SWAP

RELATED APPLICATIONS

This U.S. Patent Application is a continuation of, and claims priority to, U.S. patent application Ser. No. 17/318,867, filed on May 12, 2021, which claims priority to provisional U.S. Patent Application No. 63/034,875, entitled "MULTI-SESSION COOKIE SWAP," filed on Jun. 4, 2020, the entirety of both of which is incorporated herein by reference.

TECHNICAL FIELD

The present disclosure relates to interactions between a web browser and a website, and more particularly to the web browser swapping between multiple session cookies associated with the website based on different tabs of the web browser becoming active.

BACKGROUND

Users often use web browsers executing on computing devices to access websites. For example, a user may use a web browser to access a website for a web application that employees or other users associated with a company can use for business purposes. In other examples, a user may use a web browser to access other types of websites, such as another type of web application, a user account management portal for a service, an electronic commerce website, an entertainment website, an educational website, or any other type of website.

Many websites track distinct user sessions with web browsers based on session cookies that the websites provide to the web browsers. For example, when a web browser accesses a website, the website can provide the web browser with a session cookie containing a unique session identifier (ID) that uniquely identifies a particular user session with the website. Thereafter, when the web browser sends a request to the website, the web browser can send the session cookie back to the website. The session cookie provided by the web browser by the website can thus indicate that the request from the web browser is associated with the user session identified by the session ID in the session cookie. The website can accordingly use the session cookie to identify the request from the web browser as being associated with an existing user session.

Many web browsers are configured to store session cookies associated with websites in a shared memory location that is accessible by any tab and/or any instance of the web browser. For instance, a web browser executing on a computing device can be configured to store session cookies in a local global memory location on the computing device that can be accessed by each instance of the web browser executing on the computing device, and/or by each tab opened in the web browser on the computing device. Accordingly, a new tab or window of the web browser may be able to continue a previously-established user session with a website by accessing a stored session cookie in a shared memory location, and by providing the session cookie to the website.

For example, if a user establishes a user session with a website through a web browser, the website can store a session cookie for the website in a shared memory location that is accessible by any tab or instance of the web browser. If the user later navigates to the website using a new tab of the web browser or a new window of the web browser, the web browser can provide the stored session cookie from the shared memory location to the website, and thereby continue the existing user session with the website in the new tab or window. Similarly, if the user switches between different tabs or instances of the website that are open to the website, the web browser may be configured to provide the same session cookie stored in the shared memory location to the website, such that the user can continue interacting with the website in association with the same existing user session regardless of which tab or window the user is actively using.

However, in some situations, a user may not want to access the same user session with a website in different tabs or windows of a web browser. For instance, a user may want a first user session with a website to be associated with a first tab of a web browser, and want a second session with the same website to be associated with a second tab of the web browser, such that the user can switch between the open tabs to switch between the different user sessions. Nevertheless, if the website does not natively support multiple concurrent user sessions with respect to a single web browser, or with respect to different tabs of a web browser, and is coded under the assumption that each web browser will only be associated with a single user session, the website may provide a single session cookie to the web browser. As discussed above, the web browser may store the single session cookie in a shared memory location, and be configured to return the single session cookie to the website regardless of which tab or window of the web browser is in active use. This can be frustrating or confusing for users in some situations, and/or lead to errors.

As an example, a user may be a company representative who uses a web browser to access an account management website to view and/or edit customer account information. The user may, in some situations, be assigned to work on two different customer accounts. The user may accordingly want to use a first tab of the web browser to view or edit information about a first customer account via the account management website, and also use a second tab of the web browser to view or edit information about a second customer account via the account management website. The user may want to be able to switch between the two tabs of the web browser, depending on whether the user is actively working on the first customer account or the second customer account. However, as discussed above, when the web browser sends a request to open the account management website in the second tab, the web browser may send the account management website an existing session cookie that is already in use by the first tab and is present in global storage. The website would determine from this existing session cookie that the request associated with the second tab is also associated with the first customer account, and respond by returning data associated with the first customer account to be displayed in the second tab. This may be frustrating for the user, because the user intended to access information about the second customer account in the second tab.

Moreover, even if information about the first customer account is initially displayed upon loading the account management website in the second tab, the user may use the second tab to log into the second customer account on the account management website, or otherwise access the second customer account on the website. However, the website may determine from this behavior that the existing session cookie is now associated with the second customer account, and is no longer associated with the first customer account. Consequently, if the user returns to actively using the first tab in an attempt to go back to working on the first customer account, any requests that the web browser sends to the account management website in association with the first tab may include the session cookie from global storage that the account management website now associates with the second customer account, even though the user considers the first tab to still be associated with the first customer account. In some situations, the web browser sending data associated with the first customer account, along with a session cookie that the account management website now associates with the second customer account, can cause the account management website to lock up, time out, or experience other errors. In other situations, the account management website may return data associated with the second customer account instead of the first customer account, which can be frustrating and/or confusing for the user when the user intended to work on the first customer account.

In some examples, it can be difficult, costly, and/or impractical to update a website to support different user sessions associated with different tabs of a web browser. For example, a website may be provided by a company to its employees or other users for business purposes as discussed above. However, back-end elements of the website, such as back-end databases or back-end applications, may be provided by a third-party vendor or other different entity. Accordingly, even if the company's employees would like to access different customer accounts through the website in different tabs, or otherwise engage in different user sessions with the website in different tabs, the third-party back-end elements may not natively support different user sessions with the same web browser. Moreover, the company may not have the ability to update or edit the back-end elements to support multiple user sessions. For instance, a third-party vendor may have provided the back-end elements as a compiled application, and the company may not have a copy of the source code that could be edited to cause the application to support multiple user sessions. As another example, it may be difficult, time-consuming, and/or costly to re-code an existing back-end element to use a new or updated system architecture that could support multiple user sessions.

In some cases, workarounds may enable users to have concurrent user sessions with a website that does not natively support multiple user sessions. However, such workarounds can be difficult, resource-intensive, and/or confusing, and may not be transparent to users.

For example, a user could open the website in a first web browser, such as Chrome®, and also open the website in a different web browser, such as Firefox®. In this example, although the website may not natively support multiple user sessions with the same web browser, the website may provide different session cookies to the different web browsers that each have distinct global storage locations. Accordingly, each web browser could engage in different user sessions with the website. However, it can be cumbersome for users to keep multiple different types of web browsers open on their computers, and can also lead to increased memory usage and/or processor load on such computers.

As another example, a user could attempt to engage in different sessions with a website by enabling "private mode" in one tab or window of a web browser, and by using "normal mode" in another tab or window of the web browser. Some web browsers have "private mode" features that may be associated with a different storage location for cookies than for cookies associated with operations of the web browsers in "normal mode." Accordingly, the web browser could obtain different session cookies from the website in association with different "normal mode" and "private mode" instances of the web browser, and thereby permit the user to engage in a first user session with the website in the "normal mode" instance and to engage in a second user session with the website in the "private mode" instance. However, this approach would not be transparent to users, and would require users to take affirmative steps to turn on "private mode," and to keep "private mode" and "normal mode" windows or tabs active. This approach would also limit users to using at most two different user sessions in the same web browser, one in "private mode" and one in "normal mode." In some example, web browsers may also disallow integration with Single Sign-on (SSO) solutions when in "private mode," such that user interfaces for users to enter login credentials may not be displayed when in "private mode." In such examples, use of "private mode" may not allow users to engage in a separate user session at all.

As still another example, some web browsers allow different profiles or containers to be associated with different tabs, such that different session cookies for a website could be stored separately by a web browser in association with different profiles or containers. However, the approach is also not transparent to users, and would again need users to take affirmative steps to associate different profiles or containers with different tabs in a web browser, in order to avoid the issues discussed above with a website that is not configured to natively support different user sessions with the same web browser.

The example systems and methods described herein may be directed toward mitigating or overcoming one or more of the deficiencies described above.

SUMMARY

The systems and methods described herein can configure a web browser to manage different session cookies for different user sessions with the same website. For example, the web browser can store session cookies, associated with different user sessions with a website, in memory in tab storage locations that are specific to different browser tabs associated with the different user sessions, instead of in a global storage location that is accessible by any tab of the web browser. When the web browser prepares to send a request to the website in association with a first tab of the web browser, the web browser can temporarily move a first session cookie from a first tab storage location, associated with the particular tab, into a global storage location associated with the web browser. The web browser can accordingly send the first session cookie, temporarily stored in the global storage location, in a request to the website, and then return the first session cookie from the global storage location back to the first tab storage location associated with the first tab. If the web browser later sends a request to the website in association with a second tab, the web browser can temporarily move a second session cookie associated with the second tab from a second tab storage location into the global storage location, send the second session cookie to the website, and then return the second session cookie to the second tab storage location. Accordingly, the web browser can use different session cookies, associated with different user sessions and different tabs, to interact with the same website, depending on which tab is active.

According to a first aspect, a computer-implemented method can include storing, by a web browser, and in a tab storage location associated with a tab of the web browser, a session cookie associated with a user session between the web browser and a website. The computer-implemented method can also include determining, by the web browser in association with the tab, an occurrence of an event associated with the website, and copying, by the web browser at least in part in response to determining the occurrence of the event, the session cookie from the tab storage location to a global storage location of the web browser. The computer-implemented method can also include sending, by the web browser, a request to a server associated the website, wherein the request includes the session cookie copied to the global storage location, and deactivating, by the web browser, the session cookie in the global storage location after sending the request.

According to a second aspect, one or more non-transitory computer-readable media can store computer-executable instructions that, when executed by one or more processors of a computing device, cause the one or more processors to perform operations. The operations can include storing, in a tab storage location associated with a tab of a web browser executing on the computing device, a session cookie associated with a user session between the web browser and a website. The operations can also include determining an occurrence of an event associated with the website, in association with the tab, and copying, at least in part in response to determining the occurrence of the event, the session cookie from the tab storage location to a global storage location of the web browser. The operations can also include sending a request to a server associated the website, wherein the request includes the session cookie copied to the global storage location, and deactivating the session cookie in the global storage location following sending the request.

According to a third aspect, the a computer-implemented method can include sending, by a web browser, a first request to a server to load a website in association with a first tab of the web browser, receiving, by the web browser, a first session cookie from the server, the first session cookie being associated with a first user session with the website, and moving, by the web browser, the first session cookie from a global storage location of the web browser to a first tab storage associated with the first tab. The computer-implemented method can also include sending, by the web browser, a second request to the server to load the website in association with a second tab of the web browser, receiving, by the web browser, a second session cookie from the server, the second session cookie being associated with a second user session with the website, and moving, by the web browser, the second session cookie from the global storage location to a second tab storage location associated with the second tab. The computer-implemented method can also include determining, by the web browser, an occurrence of an event associated with the website in the first tab that prompts a third request to the server, and copying, by the web browser at least in part in response to determining the occurrence of the event, the first session cookie to the global storage location from the first tab storage location. The computer-implemented method can further include sending, by the web browser, the third request to the server in association with the first tab, the third request including the first session cookie based on the first session cookie being moved to the global storage location.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
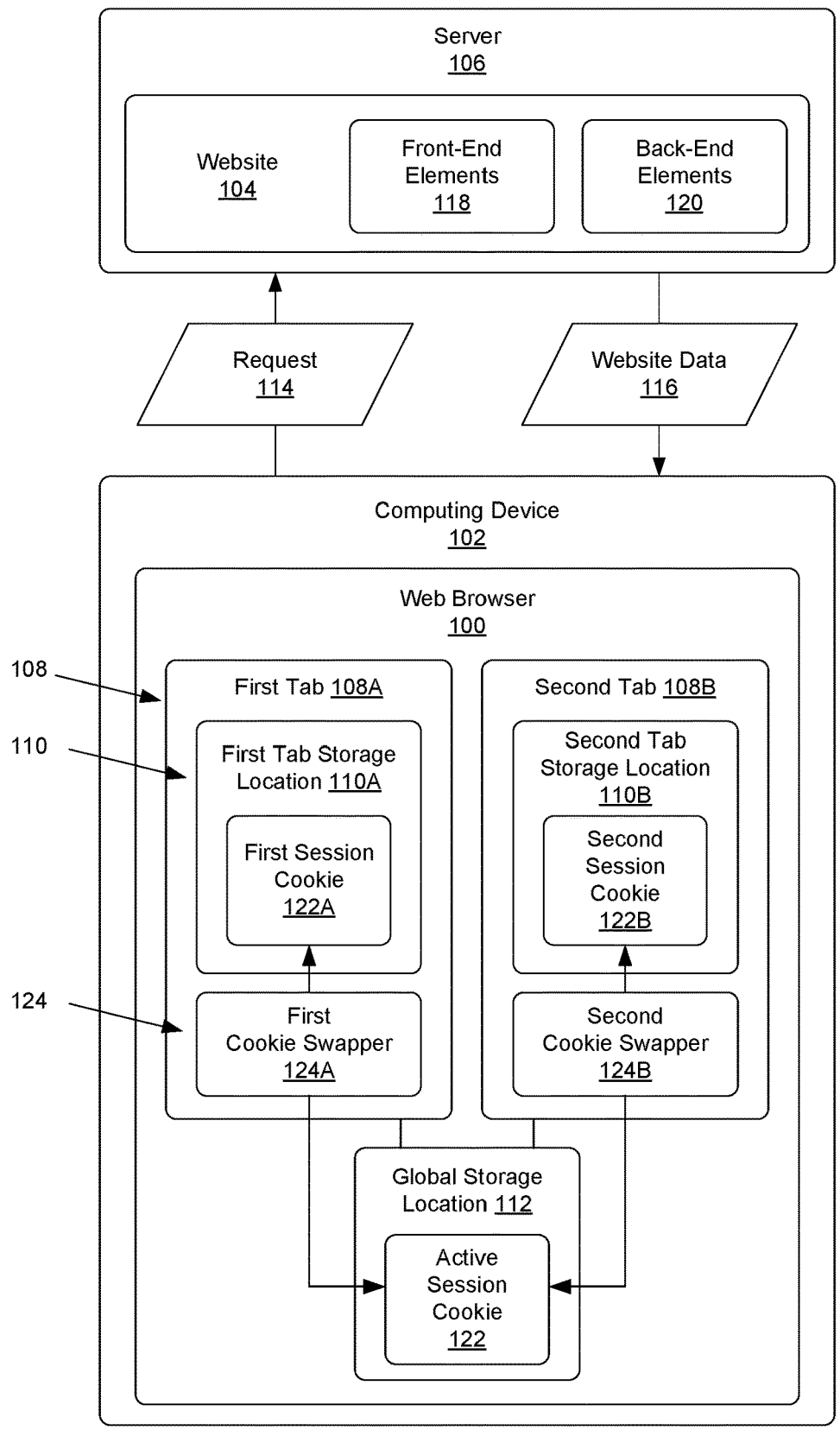
FIG. 1 shows an example of a web browser on a computing device interacting with a website.

FIG. 1 shows an example of a web browser 100 on a computing device 102 interacting with a website 104. The web browser 100 can be an executable application that users of the computing device 102 can use to browse websites, including the website 104. The computing device 102 can be a laptop computer, desktop computer, smartphone, mobile device, workstation, tablet computer, gaming device, or any other type of computing device that can execute the web browser 100.

The website 104, including data associated with the website 104, can be hosted on at least one server 106. The server 106 may be a remote computing device, a cloud computing element, or any other computing system configured to store data associated with the website 104 in memory, receive data from the web browser 100 in association with the website 104, and/or provide data to the web browser 100 in association with the website 104. The server 106 may exchange data, associated with the website 104, with the web browser 100 and/or computing device 102 via the Internet and/or other data networks.

In some examples, the website 104 can be a web application or other website that users associated with a company can use to access and/or edit account information, order information, or other information associated with customers of the company. By way of a non-limiting example, the website 104 may be an insurance policy administration web application that enables users associated with an insurance company, such as insurance agents, claims representatives, call center agents, underwriters, and other users, to access and/or change information about insurance policies associated with customers of the insurance company. In other examples, the website 104 may be a user account management portal for a service, an electronic commerce website, an entertainment website, an educational website, or any other type of site, page, or application that is accessible to the computing device 102 over the Internet and/or other data networks via the web browser 100.

The web browser 100 can be configured to display representations of the website 104 in one or more tabs 108 of the web browser 100, such as a first tab 108A and a second tab 108B as shown in FIG. 1. For example, the web browser 100 may display a page of the website 104 in a first tab 108A, and also display the same or a different page of the website 104 in a second tab 108B. In some examples, if multiple tabs 108 are open in the web browser 100, the web browser 100 may be configured to display content in an active tab, e.g., the first tab 108A, and hide content loaded in inactive tabs, e.g., the second tab 108B. The web browser 100 may also enable users to select different tabs 108 to change which tab is active, and accordingly change which content is displayed in the web browser 100.

The web browser 100 can have distinct tab storage locations 110 associated with each of the tabs 108 opened in the web browser 100. For example, the web browser 100 may have a first tab storage location 110A associated with the first tab 108A, and a second tab storage location 110B associated with the second tab 108B, as shown in FIG. 1. The tab storage locations 110 may be folders, directories, database structures, or other designated memory locations or data structures stored in local memory of the computing device 102. The web browser 100 can accordingly store data associated with each of the individual tabs 108 in corresponding tab storage locations 110. For example, as shown in FIG. 1, the web browser 100 can store data specific to the first tab 108A in the first tab storage location 110A, and can store data specific to the second tab 108B in the second tab storage location 110B.

The web browser 100 can also have a global storage location 112 that stores data that is accessible by any of the tabs 108, such as the first tab 108A and the second tab 108B. For example, the global storage location 112 can be a folder, directory, database structure, or other local memory location or data structure in local memory of the computing device 102 that is associated with the web browser 100.

The web browser 100 can send a request 114 associated with the website 104 to the server 106, and the server 106 can return website data 116 associated with the website 104 to the web browser 100 in response to the request 114. For example, the request 114 can be a request to load a web page of the website 104, a request to retrieve data from the website 104, a request that submits form data or other data to the website 104, or other types of requests. In some examples, the request 114 can be associated with an Hypertext Transfer Protocol (HTTP) request method, such as a GET method, a POST method, a PUT method, or any other type of HTTP request. In other examples, the request 114 can be an eXtensible Markup Language (XML) HTTP request that the web browser 100 can use to send data to the server 106, retrieve data from the server 106, update content displayed in the web browser 100 without reloading a web page, or perform other actions.

The server 106 can store, provide, and/or execute front-end elements 118 and back-end elements 120 associated with the website 104. The server 106 can include memory that stores the front-end elements 118 and/or the back-end elements 120. The server 106 can also include one or more processors that execute, and/or process data associated with, the front-end elements 118 and the back-end elements 120. The server 106 can also include network elements and/or other transmission components that the server 106 can use to exchange data with the computing device 102 over the Internet or other networks.

The front-end elements 118 of the website 104 can include data and/or instructions that can be used to load, display, and/or execute elements of the website 104 in the web browser 100. For example, the front-end elements 118 can include HyperText Markup Language (HTML) code, XML code, JavaScript code, image files, and/or other data or instructions. The front-end elements 118 can be provided by the server 106 to the web browser 100 as website data 116, to enable the web browser 100 to render and display elements of the website 104. For example, the web browser 100 can use the website data 116 provided by the server 106 to render a page of the website 104 for display to a user of the computing device 102, for instance by rendering the page of the website 104 in the first tab 108A or the second tab 108B of the web browser 100. The web browser 100 can also execute operations or functions associated with the website 104, for example by executing operations defined by JavaScript code provided in the website data 116.

The back-end elements 120 of the website 104 can include applications, databases, and other elements that are not directly accessible by users through the web browser 100. For example, the front-end elements 118 of the website 104 may enable users to submit data to the server 106, but the back-end elements 120 may process the submitted data in one or more ways, add the submitted data to a back-end database, or otherwise perform back-end operations associated with the website 104. As another example, the web browser 100 may use the front-end elements 118 to request information from the website 104, and the back-end elements 120 may determine what information to return as website data 116 to the web browser 100.

In some examples, the web browser 100 can send the request 114 to the server 106 in response to an event that occurs with respect to the website 104 in the web browser 100, such as a user clicking a button on a page of the website 104 or the web browser 100 loading a page of the website 104. For example, Asynchronous JavaScript and XML (AJAX) code in website data 116 associated with the website 104 can include a JavaScript "event listener" that prompts the web browser 100 to detect when a particular type of event occurs. When the web browser 100 detects that the particular type of event has occurred, the "event listener" code can be a trigger that prompts the web browser 100 to create an XML HTTP request, send the XML HTTP request to the server 106, and use JavaScript to process a response from the server 106. In other examples, an event can be a form submission event that prompts the web browser 100 to send the request 114 containing form data to the server 106, a page load event, a page reload event, and/or any other type of event.

In some examples, when the web browser 100 sends the request 114 to the server 106, the server 106 can determine if a user session already exists between the website 104 and the web browser 100. For example, the back-end elements 120 can track user sessions with the web browser 100 and/or other web browsers based on session cookies that correspond to user sessions with the website 104. If the server 106 determines that a user session does not already exist between the website 104 and the web browser 100, for instance if a session cookie is not included in the request 114 received from the web browser 100, the server 106 can generate and send a new session cookie corresponding to a new user session to the web browser 100 along with, or separately from, other website data 116. The session cookie can include a name, key, or other unique identifier of the user session between the website 104 and the web browser 100.

In some examples, the web browser 100 may be natively configured to store a session cookie, received from the server 106 upon initiation of a new user session, into the global storage location 112 as an active session cookie 122 associated with the website 104. The web browser 100 may also be natively configured to, if the active session cookie 122 associated with the website 104 is present in the global storage location 112, send the active session cookie 122 back to the server 106 in subsequent requests. When the web browser 100 includes the active session cookie 122 in the request 114 to the server 106, the back-end elements 120 may identify the request 114 as being associated with the corresponding existing user session. For example, the back-end elements 120 may use a session ID in the active session cookie 122 provided in the request 114 to process or look up data based on the corresponding user session, such that the server 106 can return website data 116 associated with that user session to the web browser 100.

The back-end elements 120 may not be natively configured to support multiple concurrent user sessions with the web browser 100. For example, the back-end elements 120 may include a compiled application that was coded under the assumption that a single web browser would be associated with a single user session with the website 104, regardless of which tab or instance of the web browser is used to access the website 104. Accordingly, the back-end elements 120 may not be coded to natively support using different session cookies to identify or track different concurrent user sessions associated with the same web browser.

However, the server 106 can be configured to provide cookie swappers 124 to the web browser 100 that enable the web browser 100 to engage in different user sessions with the website 104 in different tabs 108, such as the first tab 108A and the second tab 108B, even if the back-end elements 120 of the website 104 do not natively support multiple user sessions with the web browser 100. In some examples, a cookie swapper can be JavaScript code, or another type of code, script, or set of computer-executable instructions that is injected into the website data 116 provided by the server 106 to the web browser 100. For example, the server 106 may provide code for a cookie swapper in website data 116 when the web browser 100 sends a request to load a page of the website 104.

The cookie swappers 124 can be configured to cause the web browser 100 to store distinct session cookies, associated with different user sessions with the website 104, in different tab storage locations 110 associated with different tabs 108. The cookie swappers 124 can also be configured to cause the web browser 100 to temporarily copy and/or move stored session cookies associated with the different user sessions from corresponding tab storage locations 110 into the global storage location 112, and thereby use different session cookies as the active session cookie 122 in the global storage location 112, when requests associated with the corresponding tabs 108 are to be sent to the server 106.

For example, and as shown in FIG. 1, the server 106 can send the web browser 100 website data 116 that includes a first session cookie 122A and a first cookie swapper 124A, in response to a request associated with the first tab 108A. The web browser 100 can initially store the first session cookie 122A in the global storage location 112, e.g., as the active session cookie 122. However, the first cookie swapper 124A can cause the web browser 100 to move the first session cookie 122A from the global storage location 112 to the first tab storage location 110A associated with the first tab 108A. For example, the first cookie swapper 124A can cause the web browser 100 to copy the active session cookie 122 from the global storage location 112 and store the copy in the first tab storage location 110A as the first session cookie 122A. The first cookie swapper 124A can also cause the web browser 100 to delete or expire the copy of the first session cookie 122A that remains as the active session cookie 122 in the global storage location 112, such that the first session cookie 122A is no longer active in the global storage location 112. For instance, the web browser 100 may expire the active session cookie 122 in the global storage location 112 by altering a timestamp or age value of the active session cookie 122 to indicate that the active session cookie 122 is older than a predefined maximum valid age value.

Accordingly, if the web browser 100 then sends a new request to the server 106 in association with the second tab 108B, the new request may omit the first session cookie 122A because the active session cookie 122 was expired or deleted in the global storage location 112, and the first session cookie 122A is stored in the first tab storage location 110A instead of the global storage location 112. The server 106 can respond to the new request associated with the second tab 108B by returning website data 116 that includes a second session cookie 122B and a second cookie swapper 124B. The web browser 100 can initially store the second session cookie 122B in the global storage location 112, e.g., as the active session cookie 122. However, the second cookie swapper 124B can cause the web browser 100 to move the second session cookie 122B from the global storage location 112 to the second tab storage location 110B associated with the second tab 108B. For example, the second cookie swapper 124B can cause the web browser 100 to copy the active session cookie 122 from the global storage location 112 and store the copy in the second tab storage location 110B as the second session cookie 122B. The second cookie swapper 124B can also cause the web browser 100 to delete or expire the copy of the second session cookie 122B that remains as the active session cookie 122 in the global storage location 112, such that the second session cookie 122B is no longer active in the global storage location 112.

Thereafter, when the web browser 100 prepares to send a subsequent request, such as the request 114, to the server 106 in association with the first tab 108A, e.g., with the first tab 108A active, the first cookie swapper 124A can cause the web browser 100 to temporarily copy the first session cookie 122A from the first tab storage location 110A back to the global storage location 112 as the active session cookie 122. For example, the web browser 100 can copy the first session cookie 122A in the first tab storage location 110A, and add the copy of the first session cookie 122A to the global storage location 112 as the active session cookie 122. A copy of the first session cookie 122A may also remain in the first tab storage location 110A. The web browser 100 can include the first session cookie 122A, a copy of which is now present in the global storage location 112 as the active session cookie 122, in the request 114 sent to the server 106 in association with the first tab 108A. The back-end elements 120 can accordingly identify the user session that corresponds to the first session cookie 122A. After the request 114 has been sent in association with the first tab 108A, the first cookie swapper 124A can cause the web browser 100 to delete or expire the active session cookie 122 (a copy of the first session cookie 122A) in the global storage location 112.

If a user then switches to the second tab 108B and takes action that prompts another request 114 to be sent to the server 106, the second cookie swapper 124B can cause the web browser 100 to move a copy of the second session cookie 122B from the second tab storage location 110B into the global storage location 112 as the active session cookie 122. The web browser 100 can accordingly include the second session cookie 122B, a copy of which is now present in the global storage location 112 as the active session cookie 122, in the request 114 sent to the server in association with the second tab 108B. The back-end elements 120 can accordingly identify the request 114, sent to the server 106 in association with the second tab 108B, as being associated with a different user session than the request 114 sent to the server 106 in association with the first tab 108A. As such, even if the back-end elements 120 do not natively support multiple concurrent user sessions with the same web browser, the back-end elements 120 may nevertheless determine that different requests, sent by the web browser 100 in association with the first tab 108A and the second tab 108B, include different session cookies and are thus associated with different user sessions.

In some examples, a cookie swapper, such as the first cookie swapper 124A and/or the second cookie swapper 124B, can be provided by the server 106 to the web browser 100 as part of the website data 116. For example, the front-end elements 118 in the server 106 can be configured or modified to include cookie swappers 124, such that a cookie swapper is provided in HTML files or other data associated with the website 104 to the web browser 100 when one or more pages of the website 104 are loaded in the web browser 100. For instance, in some examples, a cookie swapper can be JavaScript code that is injected into HTML data or other the website data 116 provided by the server 106 to the web browser 100 when the web browser 100 sends the request 114 to load the website 104.

In some examples, the front-end elements 118 and the back-end elements 120 may be provided by, or be modifiable by, different entities. Accordingly, a first entity can modify the front-end elements 118 to cause the server 106 to provide cookie swappers 124 to the web browser 100, even if the first entity does not have the ability or permission to modify the back-end elements 120 provided by a second entity to directly support multiple concurrent user sessions with a single web browser, such as the web browser 100.

For instance, in the example discussed above in which the website 104 is an insurance policy administration web application, the back-end elements 120 can include a compiled back-end application provided to an insurance company by a third-party vendor. The compiled back-end application may be configured to track customer insurance policies, retrieve information about customer insurance policies, make changes to customer insurance policies, and/or otherwise manage customer insurance policies. In this example, the insurance company may operate the server 106, or otherwise have access to modify the front-end elements 118 on the server 106. For example, the insurance company may be able to modify HTML code, JavaScript code, or other front-end elements 118 that interact with the back-end elements 120. However, the insurance company may not be able to directly modify how the back-end elements 120 function. For example, the third-party vendor may have provided the back-end elements 120 to the insurance company as a compiled application, and may not have provided the insurance company with editable source code for the back-end elements.116.

However, even if the back-end elements 120 are not natively configured to support multiple concurrent user sessions with web browsers, such as the web browser 100, the server 106 can be configured to provide the web browser 100 with the cookie swappers 124 to enable the web browser 100 to engage in different user sessions with the back-end elements 120 in different tabs 108. For instance, in some examples, an entity can edit the front-end elements 118 to cause the server 106 to provide the cookie swappers 124 as injected JavaScript code when the web browser 100 loads pages of the website 104 in tabs 108.

In other examples, a cookie swapper can be installed into the web browser 100 as a plug-in, extension, or other add-on component. In still other examples, the cookie swappers 124, associated with the website 104 hosted on the server 106, can be provided to the web browser 100 by a different server, such as a pass-through server that processes traffic being passed between the web browser 100 and the server 106 that hosts the front-end elements 118 and/or the back-end elements 120 of the website 104. In alternate examples, a cookie swapper can execute on such a pass-through server, or on the server 106 that also executes the back-end elements 120. For example, a server can be configured to manage session cookies associated with different user sessions, and to replace a session cookie in a request received from the web browser 100 with a different session cookie for a different user session, before passing the modified request to the back-end elements 120.

In some examples, cookie swappers 124 or similar elements provided to the web browser 100 in association with the website 104 can cause the web browser 100 to store any other type of data instead or, or in addition to, session cookies in tab storage locations 110 associated with corresponding tabs 108. For example, the back-end elements 120 may cause the server 106 to provide other types of data to the web browser 100 in association with a particular tab. If an entity associated with the computing device 102, the website 104, or the server 106 does not want other tabs 108 of the web browser 100 to be able to access that data in the global storage location 112, the entity may provide a cookie swapper or similar element that causes the web browser 100 to store the data in a tab storage location associated with the active tab unless and until the data is to be used for subsequent interactions with the website 104. When the data is to be used for subsequent interactions with the website 104, the cookie swapper or similar element can cause the web browser 100 to temporarily move and/or copy the data from the tab storage location back to the global storage location 112 for use during the subsequent interactions.

Overall, the cookie swappers 124 can cause the web browser 100 to separately store different session cookies associated with the website 104 in different tab storage locations 110 associated with different tabs 108. When the web browser 100 prepares to send a request to the server 106 in association with a particular tab, a cookie swapper can cause the web browser 100 to temporarily copy a session cookie associated with that particular tab from a corresponding tab storage location into the global storage location 112, to be used as the active session cookie 122. The cookie swappers 124 can thus cause the web browser 100 to maintain multiple session cookies, associated with different user sessions with the website 104, in different tab storage locations 110, and to temporarily swap any of those stored session cookies in as the active session cookie 122 for the website 104 based on which tab is active and/or associated with a request to the website 104. Accordingly, the cookie swappers 124 can allow users to use different tabs 108 of the web browser 100 to engage in distinct user sessions with the website 104 that are associated with different session cookies, even if the back-end elements 120 of the website 104 are not natively configured to support multiple concurrent user sessions with the same web browser. The cookie swappers 124 can cause the web browser 100 to swap in different session cookies associated with different tabs 108 as the active session cookie 122 in a user-transparent manner, such that a user can engage in different user sessions with the website 104 in different tabs 108 without the user taking active steps to manage the session cookies.

Figure 2:
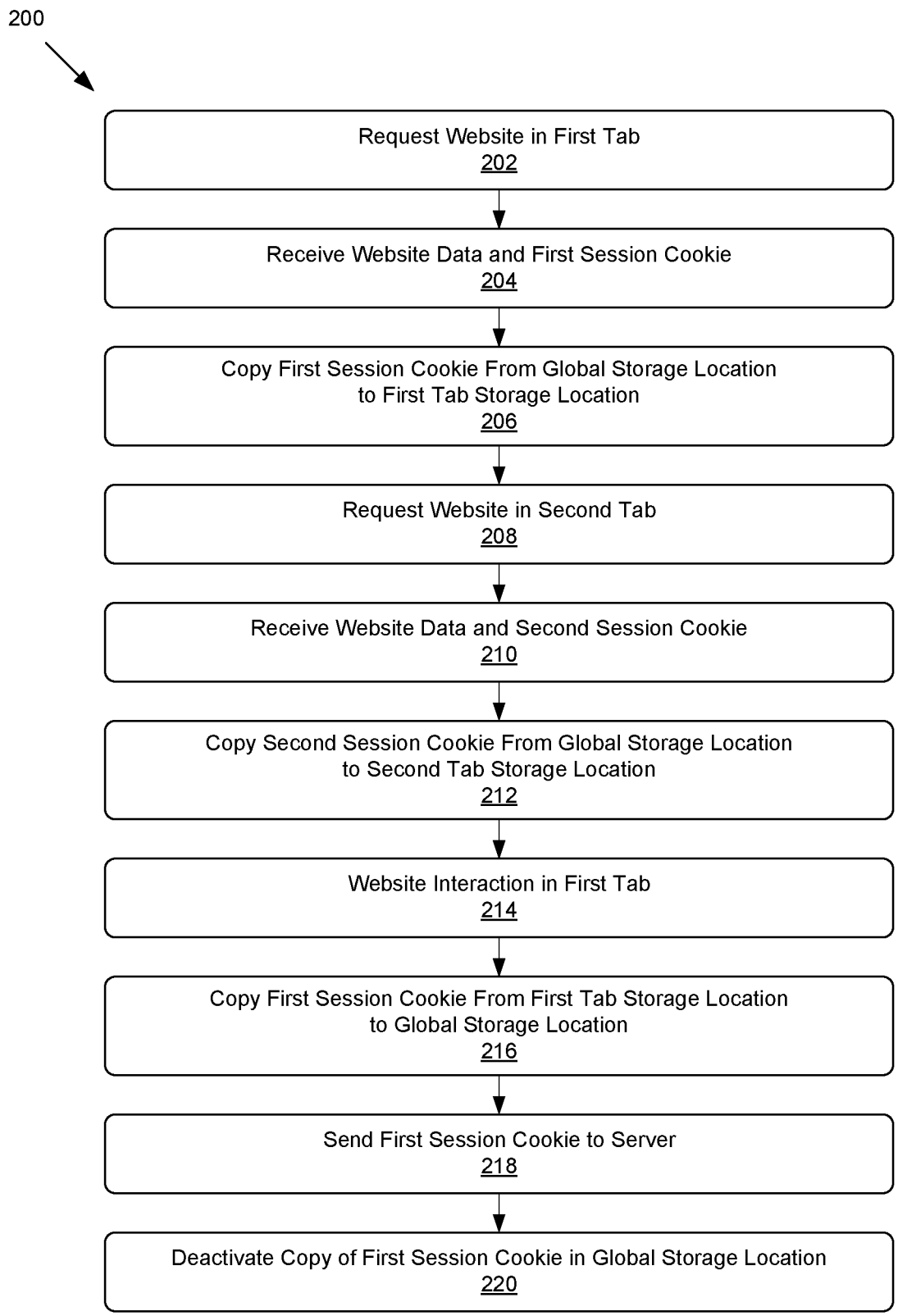
FIG. 2 shows a flowchart of example of a web browser swapping session cookies associated with different tabs, based on a cookie swapper.

FIG. 2 shows a flowchart of an example 200 of a web browser, such as the web browser 100, swapping session cookies associated with different tabs 108, e.g., using cookie swappers 124. At block 202, the web browser 100 can send a request to the server 106 to load a representation of the website 104, in association with the first tab 108A of the web browser 100. In this example, a user session may not yet have been established between the web browser 100 and the server 106, and accordingly the request 114 sent at block 202 may lack a session cookie.

At block 204, the web browser 100 may receive website data 116 from the server 106, and use the website data 116 to display elements of the website 104 in the first tab 108A. Back-end elements 120 on the server 106 may have determined, based on the lack of a session cookie in the request 114, that the request 114 is not associated with an existing user session, and may issue the first session cookie 122A in association with a new user session. For example, back-end elements 120 on the server 106 may generate the first session cookie 122A and/or associate the first session cookie 122A with a new first user session. The website data 116 received by the web browser 100 at block 204 may accordingly include the first session cookie 122A, as well as other data such as HTML code, JavaScript code, and other elements that the web browser 100 can use to load a representation of the website 104 in the first tab 108A. The web browser 100 can be natively configured to initially store the first session cookie 122A in the global storage location 112 as the active session cookie 122. In some examples, the website data 116 received by the web browser 100 at block 204 in association with the first tab 108A can include the first cookie swapper 124A, such as JavaScript code associated with the first cookie swapper 124A.

The website data 116 received at block 204 for the first tab 108A can be associated with the first session cookie 122A and the first user session. For example, if the website 104 is configured to allow users to view and/or edit customer accounts, the website data 116 received at block 204 can be associated with a first customer account. Accordingly, the web browser 100 can display information associated with the first customer account in the first tab 108A, or otherwise display information in the first tab 108A that is associated with the first user session between the web browser 100 and the website 104.

At block 206, the first cookie swapper 124A can cause the web browser 100 to copy the first session cookie 122A from the global storage location 112 to the first tab storage location 110A associated with the first tab 108A. For example, the first cookie swapper 124A received in the website data 116 for the first tab 108A may instruct the web browser 100 to copy the active session cookie 122 from the global storage location 112 into the first tab storage location 110A associated with the first tab 108A as the first session cookie 122A, and to delete or expire the active session cookie 122 in the global storage location 112 so that the first session cookie 122A is no longer active in the global storage location 112. For instance, in some examples, the first cookie swapper 124A may cause the web browser 100 to expire the active session cookie 122 (the copy of the first session cookie 122A) in the global storage location 112 by altering a timestamp or age value of the active session cookie 122 to indicate that the active session cookie 122 in the global storage location 112 is older than a predefined maximum valid age value.

At block 208, the web browser 100 can send a request to the server 106 to load a representation of the website 104 in association with the second tab 108B of the web browser 100. For example, while the user may have been using the first tab 108A during blocks 202, block 204, and block 206, the user may have opened the second tab 108B as a new tab, or switched from the first tab 108A to the second tab 108B, and instructed the web browser 100 to load a representation of the website 104 in the second tab 108B. Although the web browser 100 already received the first session cookie 122A associated with the website 104 in association with the first tab 108A at block 204, as discussed above the web browser 100 can have copied the first session cookie 122A to the first tab storage location 110A and deleted or expired a copy of the first session cookie 122A from the global storage location 112 at block 206. Accordingly, because there is no valid and/or active session cookie associated with the website 104 in the global storage location 112 at block 208, the request 114 the web browser 100 sends to the server 106 at block 208 may lack a session cookie.

At block 210, the web browser 100 may receive website data 116 from the server 106 in association with the second tab 108B, and use the website data 116 to display elements of the website 104 in the second tab 108B. In particular, although the server 106 already began the first user session with the web browser 100 at block 204 in association with the first session cookie 122A, the first cookie swapper 124A can have caused a copy of the first session cookie 122A to be deleted or expired in the global storage location 112 at block 206, such that the request 114 associated with the second tab 108B omits the first session cookie 122A, as discussed above. Accordingly, based on the lack of a session cookie in the request 114 sent at block 208, the back-end elements 120 on the server 106 may not recognize that the request 114 sent at block 208 is associated with an existing user session associated with the web browser 100, and may respond by issuing a new session cookie associated with a new user session. For example, the back-end elements 120 on the server 106 may generate the second session cookie 122B and/or associate the second session cookie 122B with a new second user session. The website data 116 received by the web browser 100 at block 210 may accordingly include the second session cookie 122B, as well as other data such as HTML code, JavaScript code, and other elements that the web browser 100 can use to load a representation of the website 104 in the second tab 108B. The web browser 100 can be natively configured to initially store the second session cookie 122B in the global storage location 112 as the active session cookie 122. In some examples, the website data 116 received by the web browser 100 at block 210 can include the second cookie swapper 124B, such as JavaScript code associated with the second cookie swapper 124B.

The website data 116 received at block 210 for the second tab 108B can be associated with the second session cookie 122B and the second user session. For example, if the website 104 is configured to allow users to view and/or edit customer accounts, the website data 116 received at block 210 for the second tab 108B can be associated with a second customer account. As noted above, website data 116 received by the web browser 100 at block 204 for the first tab 108A may be associated with a first customer account. Accordingly, the web browser 100 can display information associated with the first customer account in the first tab 108A, and display information associated with the second customer account in the second tab 108B, such that the two tabs 108 are associated with different user sessions with the website 104.

At block 212, the second cookie swapper 124B can cause the web browser 100 to copy the second session cookie 122B from the global storage location 112 to the second tab storage location 110B associated with the second tab 108B. For example, the second cookie swapper 124B received in the website data 116 for the second tab 108B may instruct the web browser 100 to copy the active session cookie 122 from the global storage location 112 into the second tab storage location 110B associated with the second tab 108B as the second session cookie 122B, and to delete or expire the active session cookie 122 in the global storage location 112 so that the second session cookie 122B is no longer active in the global storage location 112.

At block 214, the web browser 100 may detect an interaction with the website 104 in the first tab 108A. For example, the user of the web browser 100 may have switched back to the first tab 108A to continue working with respect to the first user session instead of the second user session, and clicked a button, submitted form data, instructed the web browser 100 to reload the website 104, and/or taken another type of action that involves sending a new request to the server 106. As discussed above, the first session cookie 122A associated with the first tab 108A may have been copied from the global storage location 112 to the first tab storage location 110A associated with the first tab 108A, such that a copy of the first session cookie 122A is not present or active in the global storage location 112 at block 214. However, in response to the website interaction detected at block 214, at block 216 the first cookie swapper 124A associated with the first tab 108A can cause the web browser 100 to at least temporarily add a copy of the first session cookie 122A from the first tab storage location 110A associated with the first tab 108A into the global storage location 112 as the active session cookie 122. For example, the first cookie swapper 124A can cause the web browser 100 to copy the first session cookie 122A from the first tab storage location 110A to the global storage location 112 as the active session cookie 122, or otherwise set the first session cookie 122A from the first tab storage location 110A to be the active session cookie 122 in the global storage location 112.

At block 218, the web browser 100 can send the first session cookie 122A to the server 106 in response to the website interaction detected at block 214. For example, the web browser 100 can transmit a new request associated with the first tab 108A to the server 106, and can include the copy of the first session cookie 122A (present in the global storage location 112 as the active session cookie 122) in the new request. Because the first session cookie 122A is included in the request sent at block 218, the back-end elements 120 on the server 106 can recognize the request as being associated with the existing first user session. The back-end elements 120 can accordingly cause the server 106 to return website data 116 that is associated with the first user session, make changes to a back-end database in association with the first user session based on data sent by the web browser 100 to the server 106 in the request, and/or take other actions in association with the first user session.

At block 220, after sending the new request associated with the first tab 108A, based in part on the copy of the first session cookie 122A that was temporarily added as the active session cookie 122 to the global storage location 112 at block 216, the first cookie swapper 124A can cause the web browser 100 to deactivate the copy of the first session cookie 122A (the current active session cookie 122) in the global storage location 112. For example, the first cookie swapper 124A may instruct the web browser 100 to delete or expire the active session cookie 122 in the global storage location 112. Although the copy of the first session cookie 122A can be deleted or expired from the global storage location 112 at block 220, a copy of the first session cookie 122A stored in the first tab storage location 110A at block 206 may remain stored in the first tab storage location 110A.

As noted above, in some examples, cookie swappers 124 can enable the web browser 100 to display information associated with a first customer account in the first tab 108A, and display information associated with a second customer account in the second tab 108B. Accordingly, in some examples, the operations of the web browser 100 at blocks 202-206 may correspond to a user working on the first customer account in the first tab 108A, the operations of the web browser 100 at blocks 208-212 may correspond to the user working on the second customer account in the second tab 108B, and the operations of the web browser 100 at blocks 214-220 may correspond to the user returning to the first tab 108A to switch back to working on the first customer account.

Although FIG. 1 and FIG. 2 show examples with two tabs 108, cookie swappers 124 can enable the web browser 100 to engage in any number of distinct user sessions with the website 104 in any number of tabs 108. As discussed above, cookie swappers 124 can cause the web browser 100 to store session cookies for distinct user sessions with the website 104, associated with corresponding tabs 108, in distinct tab storage locations 110 for the corresponding tabs 108. When the web browser 100 prepares to send a request to the server 106 in association with an active tab, the cookie swapper associated with the active tab can cause the web browser 100 to temporarily copy a stored session cookie associated with the active tab from a corresponding tab storage location to the global storage location 112, if such a session cookie has previously been received and stored in the tab storage location associated with the active tab. The web browser 100 can accordingly include a previously-received and existing session cookie associated with the active tab in a request sent to the server 106. Even if back-end elements 120 or other elements on the server 106 are not natively configured to process different user sessions with a single web browser, such as the web browser 100, cookie swappers 124 can thus allow different user sessions to be associated with different tabs 108 of the web browser. When users switch between different tabs 108, cookie swappers 124 can cause the web browser 100 to send different session cookies to the server 106 that correspond to the different tabs 108, and therefore enable users to engage in different user sessions with the website 104 in different tabs 108. In some examples, individual cookie swappers 124 may operate independently in association with corresponding tabs, as discussed below with respect to FIG. 3.

Figure 3:
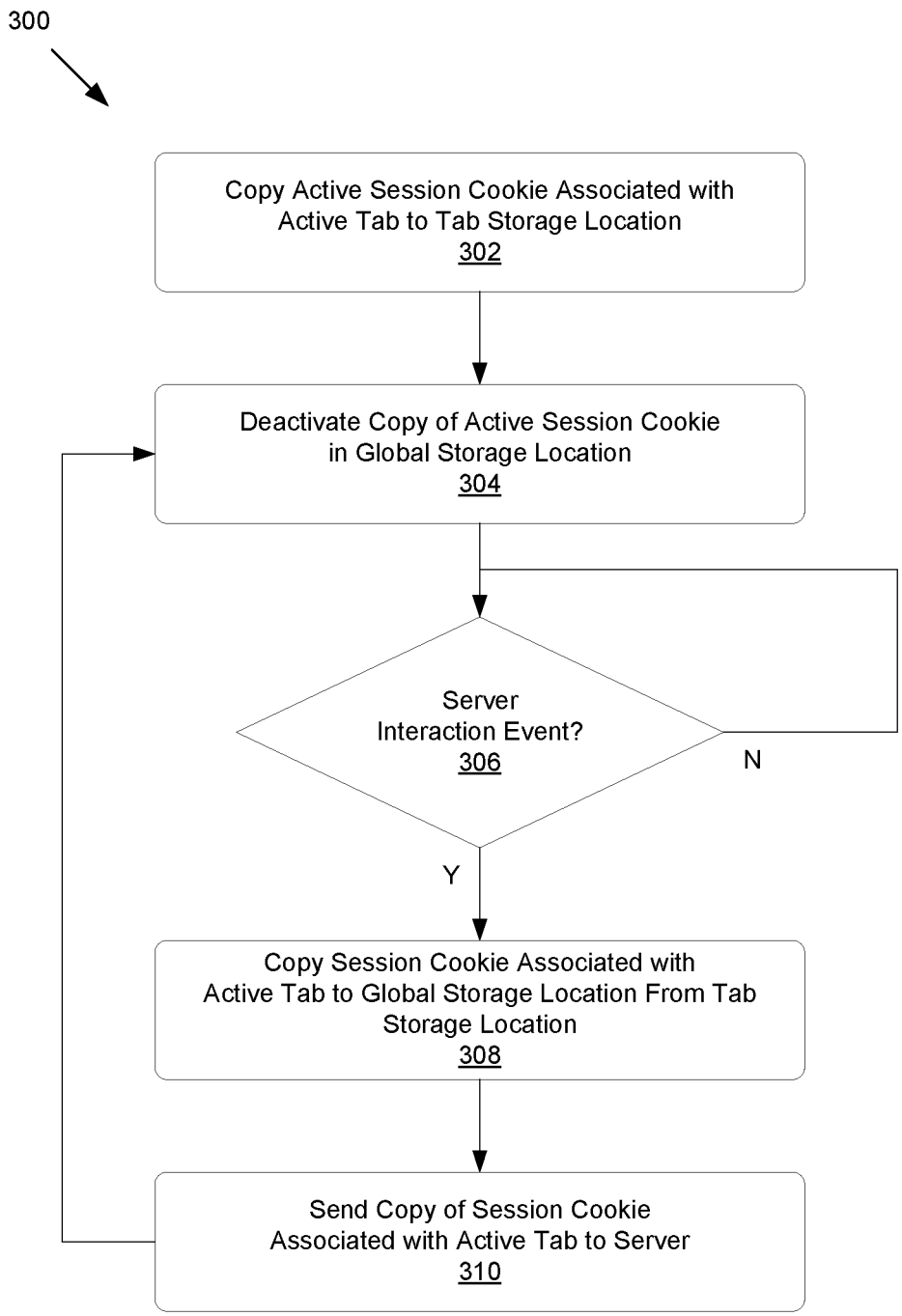
FIG. 3 shows a flowchart of example operations of a cookie swapper in association with a web browser.

FIG. 3 shows a flowchart of an example 300 of operations of a cookie swapper in association with the web browser 100. In some examples, the cookie swapper can be provided as executable JavaScript code injected into, or otherwise provided with, HTML files or other website data 116 associated with a website, such as the website 104. The cookie swapper can be provided to the web browser 100 by the server 106 in response to a request associated with a tab of the web browser 100, such as the first tab 108A or the second tab 108B. For example, the cookie swapper that performs the operations shown in FIG. 3 can be the first cookie swapper 124A associated with the first tab 108A shown in FIG. 1, or the second cookie swapper 124B associated with the second tab 108B shown in FIG. 1.

At block 302, the cookie swapper can cause the web browser 100 to copy the active session cookie 122 associated with the website 104 from the global storage location 112 to a tab storage location associated with the active tab of the web browser 100. For example, the web browser 100 may have recently received the active session cookie 122 in the global storage location 112 from the server 106 in association with a new user session with the website 104. As another example, the active session cookie 122 in the global storage location 112 may be associated with a previously-existing user session with the website 104. At block 302, the cookie swapper can cause the web browser 100 to move or copy the active session cookie 122 from the global storage location 112 into the tab storage location associated with the active tab. As an example, if the active tab is the first tab 108A shown in FIG. 1, the first cookie swapper 124A can cause the web browser 100 to move or copy the active session cookie 122 from the global storage location 112 into the first tab storage location 110A as the first session cookie 122A.

In some examples, the operations of block 302 can occur as part of an initialization of the cookie swapper when the active tab of the web browser 100 loads or refreshes a page of the website 104. For example, the initialization can include determining a name of the active session cookie 122 based on a prefix of a name value included in the active session cookie 122, setting a context root based on a Uniform Resource Locator (URL) of the website 104, and then storing a copy of the active session cookie 122 in the tab storage location using a key or index value determined based on the name of the active session cookie 122 and/or the context root. In other examples, the operations of block 302 can occur after a request has been sent to the server 106 using the active session cookie 122, as discussed further below. For instance, in some examples, a session cookie that was previously stored in the tab storage location and was returned to the global storage location 112 can be returned to the tab storage location using the using a key or index value previously determined based on the name of the session cookie and/or the context root.

At block 304, the cookie swapper can also cause the web browser 100 to deactivate the active session cookie 122 associated with the website 104 in the global storage location 112. As an example, if the active tab is the first tab 108A shown in FIG. 1, the first cookie swapper 124A can cause the web browser 100 to deactivate a copy of the first session cookie 122A (the current active session cookie 122) in the global storage location 112. In some examples, the cookie swapper can cause the web browser 100 to delete the active session cookie 122 from the global storage location 112. In other examples, the cookie swapper can cause the web browser 100 to edit a timestamp or age value of the active session cookie 122 in the global storage location 112 to indicate that the active session cookie 122 is older than a predefined maximum valid age value. Accordingly, while the active session cookie 122 may continue to be stored in the global storage location 112, the alteration of the timestamp or age value may indicate to the web browser 100 that the active session cookie 122 in the global storage location 112 is expired and should not be sent to the server 106 in a request.

At block 306, the cookie swapper can detect if a server interaction event has occurred in association with the tab associated with the cookie swapper, and can move to block 308 when the occurrence of such a server interaction event is detected. For instance, in some examples, the cookie swapper may include one or more "event listeners," such as JavaScript code elements, that can detect when designated events occur with respect to the website 104. For example, the cookie swapper can include event listeners that detect when the web browser 100 is to send a new request to the server 106, such as an XML HTTP request associated with AJAX code, or an HTTP POST request used to submit data from a form to the server 106. When such events occur, the event listeners can be triggered and prompt the web browser 100 to perform certain actions instead or, or in addition to, standard responses to those events. For example, an event listener can cause the web browser 100 to execute one or more JavaScript functions that overwrite a prototype or default response to the event, and/or perform designated actions before, during, or after the prototype or default response to the event. If no such server interaction event has occurred, the process can wait until an occurrence of a server interaction event is detected at block 306, and then move to block 308.

At block 308, the cookie swapper can cause the web browser 100 to copy the session cookie stored in the tab storage location associated with the active tab at block 302 back to the global storage location 112. For example, the cookie swapper can use a key or index values, such as a value determined based on a name and/or context root of the stored session cookie, to retrieve the session cookie from the tab storage location and add a copy of the session cookie to the global storage location 112 as the new active session cookie 122. As an example, if the active tab is the first tab 108A shown in FIG. 1, the first cookie swapper 124A can cause the web browser 100 to add a copy of the first session cookie 122A from the first tab storage location 110A to the global storage location 112 as the active session cookie 122. A copy of the session cookie copied at block 308 may also remain stored in the tab storage location.

In some examples, at block 308, the cookie swapper can check if another session cookie associated with the website 104 already exists in the global storage location 112. If a valid session cookie associated with the website 104 is already present in the global storage location 112, such as an active session cookie that has not yet been deleted or expired, the cookie swapper can wait for a period of time before moving the session cookie associated with the currently active tab from the tab storage location into the global storage location 112. For example, if the active tab is the first tab 108A shown in FIG. 1, and if the second cookie swapper 124B for the second tab 108B has recently temporarily copied the second session cookie 122B associated with the second tab 108B into the global storage location 112 as the active session cookie 122 in order to include the second session cookie 122B in a request to the server 106, the first cookie swapper 124A for the first tab 108A can wait for one second, or any other predefined period of time, to allow time for the request associated with the second tab 108B to be sent and for the second cookie swapper 124B to cause the web browser 100 to delete or expire the copy of the second session cookie 122B in the global storage location 112.

At block 310, the web browser 100 can send the session cookie, copied to the global storage location 112 from the tab storage location at block 308, to the server 106. For example, the web browser 100 can send a request associated with the server interaction event detected at block 306 to the server 106 at block 310, and can include the current active session cookie 122 (copied from the tab storage location at block 308) stored in the global storage location 112. Because the cookie swapper caused the web browser to copy the session cookie associated with the active tab from the tab storage location associated with the active tab into the global storage location 112 as the active session cookie 122, the session cookie sent in the request to the server 106 at block 310 can be associated with the user session that is associated with the active tab.

After the web browser 100 sends a request to the server 106 that includes the current active session cookie 122 stored in the global storage location 112 at block 310, the cookie swapper can return to block 304. For example, at block 304, the cookie swapper can again cause the web browser 100 to deactivate the active session cookie 122 in the global storage location 112. However, another copy of that session cookie may remain stored in the tab storage location associated with the active tab.

In some examples, if more than one tab is open in the web browser 100, cookie swappers 124 associated with multiple tabs 108 can be executing the process of FIG. 3 in parallel. For example, the first cookie swapper 124A for the first tab 108A may be cycling through some or all of the blocks of FIG. 3 while the first tab 108A is in active use by a user, and may thereby cause the first session cookie 122A associated with the active first tab 108A to be temporarily copied from the first tab storage location 110A into the global storage location 112 as the active session cookie 122 when the first session cookie 122A is to be sent in requests 114 to the server 106. However, cookie swappers 124 for one or more other tabs, such as the second cookie swapper 124B for the second tab 108B, may be halted at block 306 because those tabs 108 are not in active use, and no server interaction events are occurring with respect to the inactive tabs. Accordingly, session cookies associated with the inactive tabs may be kept in corresponding tab storage locations, instead of in the global storage locations 112. If one of the inactive tabs 108 later becomes the active tab, and a server interaction event does occur with respect to that tab, the cookie swapper associated with that tab can then move to block 308 to temporarily copy the corresponding session cookie into the global storage location 112 as the active session cookie 122 to be included in a new request sent to the server 106. For example, if the second tab 108B becomes active and a server interaction event occurs with respect to the second tab 108B, the second cookie swapper 124B can cause the web browser 100 to temporarily copy the second session cookie 122B from the second tab storage location 110B into the global storage location 112 as the active session cookie 122.

In some examples, a cookie swapper, such as the first cookie swapper 124A or the second cookie swapper 124B, can be configured to cause the web browser 100 to copy a session cookie from a tab storage location to the global storage location 112 as the active session cookie 122 when a corresponding tab is closed in the web browser 100. By moving the session cookie for a user session associated with the closed tab into the global storage location 112 as the active session cookie 122, the web browser 100 can use the active session cookie 122 in the global storage location 112 to continue the user session if a user opens a new tab or a new instance of the web browser 100.

For example, if multiple tabs 108 are open to the website 104 and each tab is associated with a different session cookie, each session cookie can be copied from a tab storage location to the global storage location 112 as the active session cookie 122 when the corresponding tab is closed in the web browser 100. The active session cookie 122 in the global storage location 112 can therefore be a copy of the session cookie associated with the last tab that was closed. Accordingly, the next time the user opens a tab and loads the website 104, the user session associated with the last-closed tab can be resumed using the active session cookie 122 stored in the global storage location 112. If the user instead switches to a different tab, the active session cookie 122 stored in the global storage location 112, which had been associated with the last-closed tab, can be overwritten by a copy of a different session cookie from a tab storage location associated with the different tab, such that the user can instead engage in the user session associated with the different tab. In other examples, a session cookie associated with a closed tab can be deleted or kept in a tab storage location, such that the corresponding user session is not automatically resumed based on the active session cookie 122 in the global storage location 112 if the user opens a new tab.

In some examples, cookie swappers 124 can be configured to maintain a count of a number of session cookies that have been stored in tab storage locations associated with one or more tabs. For example, some cookie swappers 124 can be configured to allow a maximum number of concurrent user sessions, and can use such a count of stored session cookies to determine when the maximum number of user sessions has been reached. For instance, in some examples, the cookie swappers 124 can cause a web browser 100 to display an error or warning message when the maximum number of user sessions has been reached. However, in other examples, the cookie swappers 124 can support any number, or an unlimited number, of user sessions.

Figure 4:
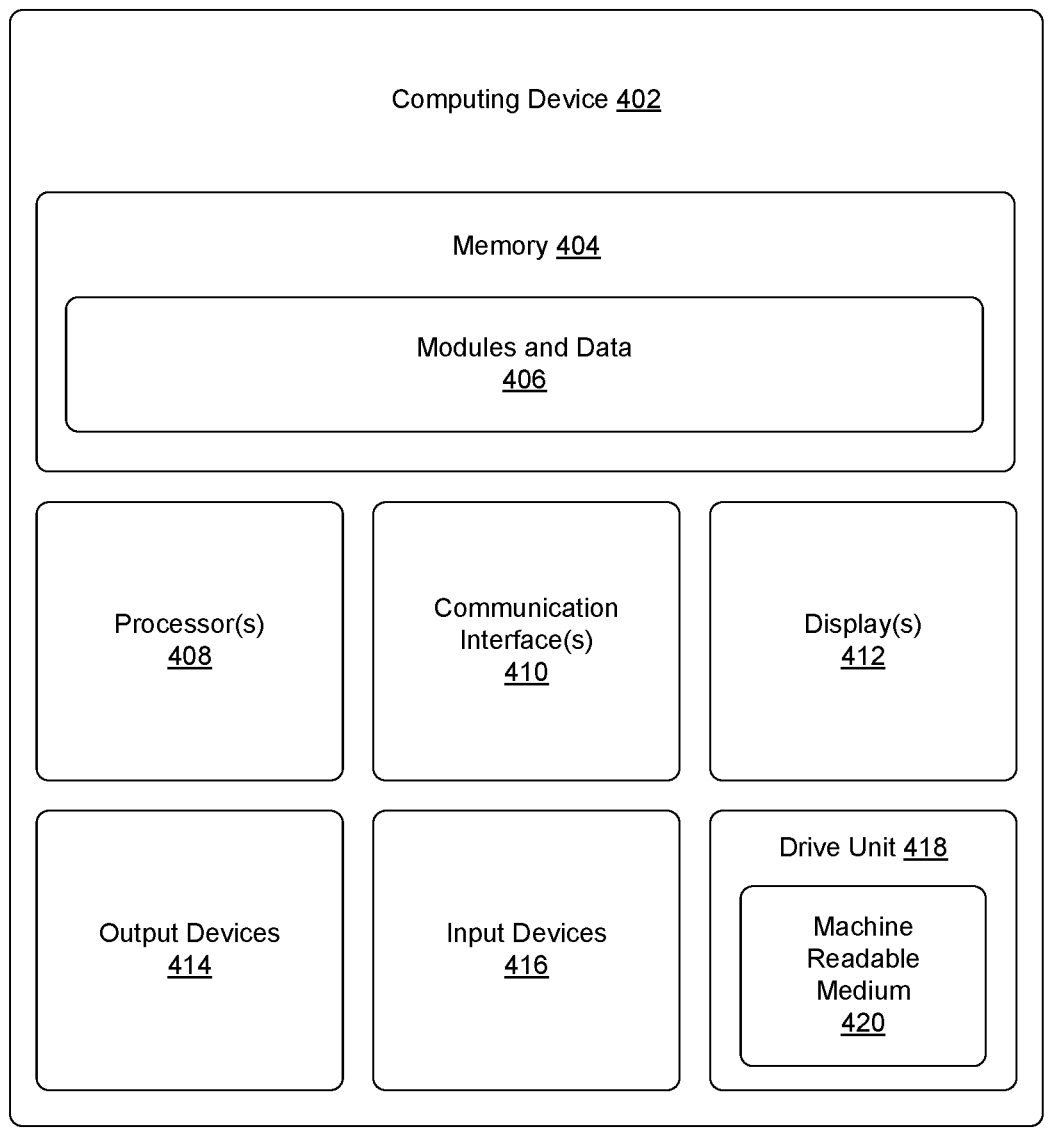
FIG. 4 shows an example system architecture for a computing device.

FIG. 4 shows an example 400 of a system architecture for a computing device 402. The computing device 402 can be an example of the computing device 102 that executes the web browser 100 and the cookie swappers 124, or an example of the server 106 that hosts the website 104, as discussed above with respect to FIG. 1. The computing device 402 can be a server, computer, or other type of computing device that can perform the operations described herein, such as the operations described above with respect to FIG. 1, FIG. 2, and/or FIG. 3.

The computing device 402 can include memory 404. In various examples, the memory 404 can include system memory, which may be volatile (such as RAM), non-volatile (such as ROM, flash memory, etc.) or some combination of the two. The memory 404 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by one or more computing devices 402. Any such non-transitory computer-readable media may be part of the computing devices 402.

The memory 404 can store modules and data 406. The modules and data 406 can include one or more of the web browser 100, session cookies, cookie swappers 124, website data 116, and/or elements described above. Additionally, or alternately, the modules and data 406 can include any other modules and/or data that can be utilized by the computing device 402 to perform or enable performing any action described herein. Such other modules and data can include a platform, operating system, and applications, and data utilized by the platform, operating system, and applications.

One or more computing devices 402 can also have processor(s) 408, communication interfaces 410, displays 412, output devices 414, input devices 416, and/or a drive unit 418 including a machine readable medium 420.

In various examples, the processor(s) 408 can be a central processing unit (CPU), a graphics processing unit (GPU), both a CPU and a GPU, or any other type of processing unit. Each of the one or more processor(s) 408 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 408 may also be responsible for executing computer applications stored in the memory 404, which can be associated with common types of volatile (RAM) and/or nonvolatile (ROM) memory.

The communication interfaces 410 can include transceivers, modems, interfaces, antennas, telephone connections, and/or other components that can transmit and/or receive data over networks, telephone lines, or other connections.

The display 412 can be a liquid crystal display or any other type of display commonly used in computing devices. For example, the display 412 may be a touch-sensitive display screen, and can then also act as an input device or keypad, such as for providing a soft-key keyboard, navigation buttons, or any other type of input.

The output devices 414 can include any sort of output devices known in the art, such as the display 412, speakers, a vibrating mechanism, and/or a tactile feedback mechanism. Output devices 414 can also include ports for one or more peripheral devices, such as headphones, peripheral speakers, and/or a peripheral display.

The input devices 416 can include any sort of input devices known in the art. For example, input devices 416 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 420 can store one or more sets of instructions, such as software or firmware, that embodies any one or more of the methodologies or functions described herein. The instructions can also reside, completely or at least partially, within the memory 404, processor(s) 408, and/or communication interface(s) 410 during execution thereof by the one or more computing devices 402. The memory 404 and the processor(s) 408 also can constitute machine readable media 420.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   receiving, by a computing device, and via a web browser executing on the computing device, executable code from a server associated with a website loaded by the web browser;
   executing, by the computing device, the executable code in association with the web browser, wherein the executable code causes the web browser to:
      store different session cookies, identifying different sessions between the web browser and the website, in different tab storage locations that correspond to different tabs of the web browser that are associated with the different sessions;
      detect a server interaction event associated with the website and an active tab of the web browser; and
      copy, in response to detecting the server interaction event, a session cookie from a tab storage location, of the different tab storage locations, to a global storage location of the web browser, the tab storage location corresponding to the active tab; and
   sending, by the computing device, a request from the web browser to the server in response to the server interaction event, wherein the request includes the session cookie copied to the global storage location.

2. The computer-implemented method of claim 1, wherein the executable code comprises:
   first executable code associated with a first tab of the web browser, and
   second executable code associated with a second tab of the web browser different from the first tab.

3. The computer-implemented method of claim 2, wherein:
   the first tab is associated with a first session, of the different sessions, between the web browser and the website, and
   the second tab is associated with a second session, of the different sessions, between the web browser and the website.

4. The computer-implemented method of claim 1, wherein the executable code comprises event listener code configured to detect the server interaction event.

5. The computer-implemented method of claim 4, wherein the event listener code is JavaScript code injected into website data provided by the server to the web browser.

6. The computer-implemented method of claim 1, wherein the executable code causes the web browser to copy the session cookie to the global storage location by:
   temporarily copying the session cookie from the tab storage location to the global storage location; and
   deactivating the session cookie in the global storage location in response to sending the request.

7. The computer-implemented method of claim 6, wherein deactivating the session cookie comprises expiring the session cookie in the global storage location by editing an age value of the session cookie to an age greater than a predefined maximum valid age value.

8. The computer-implemented method of claim 1, wherein:
   a back-end of the server is configured based on an assumption that a single session cookie is associated with the web browser, and
   a front-end of the server provides the executable code to cause the web browser to:
      store the different session cookies that identify the different sessions in the different tab storage locations; and
      provide the different session cookies to the back-end of the server as the single session cookie at different times, based on different ones of the different tabs being the active tab at the different times.

9. The computer-implemented method of claim 1, further comprising:
   receiving, by the computing device, and at different times, the different session cookies from the server via the web browser in association with the different tabs; and
   initially, by the computing device, storing the different session cookies in the global storage location of the web browser at the different times upon receiving the different session cookies from the server,
   wherein the executable code causes the web browser to:
      copying the different session cookies from the global storage location to the different tab storage locations corresponding to the different tabs respectively associated with the different session cookies; and deactivate the different session cookies in the global storage location in response to copying the different session cookies to the different tab storage locations.

10. The computer-implemented method of claim 1, wherein:
the executable code causes the web browser to:
identify a first session cookie stored in the global storage location, wherein the first session cookie:
has been received by the web browser from the server, and
is associated with a first session, between the web browser and the website, corresponding to a first tab of the web browser;
copy the first session cookie from the global storage location to a first tab storage location of the different tab storage locations; and
deactivate the first session cookie in the global storage location in response to copying the first session cookie to the first tab storage location, and
the computer-implemented method further comprises:
sending, by the computing device, and via the web browser, a session initiation request to the server to initiate a second session with the website in association with a second tab of the web browser, the session initiation request omitting the first session cookie in response to deactivation of the first session cookie in the global storage location; and
receiving, by the computing device, via the web browser, a second session cookie associated with the second session from the server in response to the session initiation request that omitted the first session cookie.

11. One or more non-transitory computer-readable media storing computer-executable instructions that, when executed by one or more processors of a computing device, cause the one or more processors to perform operations comprising:
receiving, in association with a web browser executing on the computing device, executable code from a front-end of a server associated with a website loaded by the web browser, wherein:
a back-end of the server is configured based on an assumption that a single session cookie is associated with the web browser;
storing, based on the executable code, different session cookies that identify different sessions between the web browser and the website, wherein:
the different session cookies are stored in different tab storage locations that correspond to different tabs of the web browser, and
the different tabs are associated with the different sessions;
detecting, based on the executable code, a server interaction event associated with the website and an active tab of the web browser;
copying, based on the executable code, and in response to detecting the server interaction event, a session cookie from a tab storage location, of the different tab storage locations, to a global storage location of the web browser, the tab storage location corresponding to the active tab; and
sending a request to the server in response to the server interaction event, wherein the request includes, as the single session cookie, the session cookie copied to the global storage location.

12. The one or more non-transitory computer-readable media of claim 11, wherein the executable code comprises:
first executable code associated with a first tab of the web browser, and
second executable code associated with a second tab of the web browser different from the first tab.

13. The one or more non-transitory computer-readable media of claim 11, wherein the executable code comprises event listener code configured to detect the server interaction event.

14. The one or more non-transitory computer-readable media of claim 11, wherein copying the session cookie to the global storage location comprises:
temporarily copying the session cookie from the tab storage location to the global storage location; and
deactivating the session cookie in the global storage location in response to sending the request.

15. The one or more non-transitory computer-readable media of claim 11, wherein the operations further comprise:
receiving, at different times, the different session cookies from the server via the web browser in association with the different tabs;
initially storing the different session cookies in the global storage location of the web browser at the different times upon receiving the different session cookies from the server;
copying, based on the executable code, the different session cookies from the global storage location to the different tab storage locations corresponding to the different tabs respectively associated with the different session cookies; and
deactivating the different session cookies in the global storage location in response to copying the different session cookies to the different tab storage locations.

16. A computing device, comprising:
one or more processors, and
memory storing computer-executable instructions that, when executed by the one or more processors, cause the one or more processors to:
receive, in association with a web browser executing on the computing device, executable code from a server associated with a website loaded by the web browser;
store, based on the executable code, different session cookies that identify different sessions between the web browser and the website, wherein:
the different session cookies are stored in different tab storage locations that correspond to different tabs of the web browser, and
the different tabs are associated with the different sessions;
detect, based on the executable code, a server interaction event associated with the website and an active tab of the web browser;
copy, based on the executable code, and in response to detecting the server interaction event, a session cookie from a tab storage location, of the different tab storage locations, to a global storage location of the web browser, the tab storage location corresponding to the active tab; and
send a request, including the session cookie copied to the global storage location, to the server in response to the server interaction event.

17. The computing device of claim 16, wherein the executable code comprises:
first executable code associated with a first tab of the web browser, and
second executable code associated with a second tab of the web browser different from the first tab.

18. The computing device of claim 16, wherein the executable code causes the one or more processors to copy the session cookie to the global storage location by:
- temporarily copying the session cookie from the tab storage location to the global storage location; and
- deactivating the session cookie in the global storage location in response to sending the request.

19. The computing device of claim 16, wherein the computer-executable instructions further cause the one or more processors to:
- receive, at different times, the different session cookies from the server via the web browser in association with the different tabs;
- initially store the different session cookies in the global storage location at the different times upon receiving the different session cookies from the server;
- copy, based on the executable code, the different session cookies from the global storage location to the different tab storage locations corresponding to the different tabs respectively associated with the different session cookies; and
- deactivate the different session cookies in the global storage location in response to copying the different session cookies to the different tab storage locations.

20. A system for engaging in different sessions between a web browser and a website, the system comprising:
- means for receiving, by the web browser, executable code from a server associated with the website;
- means for storing, based on the executable code, different session cookies that identify the different sessions between the web browser and the website, wherein:
  - the different session cookies are stored in different tab storage locations that correspond to different tabs of the web browser, and
  - the different tabs are associated with the different sessions;
- means for detecting, based on the executable code, a server interaction event associated with the website and an active tab of the web browser;
- means for copying, based on the executable code, and in response to detecting the server interaction event, a session cookie from a tab storage location, of the different tab storage locations, to a global storage location of the web browser, the tab storage location corresponding to the active tab; and
- means for sending a request, including the session cookie copied to the global storage location, to the server in response to the server interaction event.

* * * * *